(12) United States Patent
Homma et al.

(10) Patent No.: US 8,532,148 B2
(45) Date of Patent: Sep. 10, 2013

(54) TIME SYNCHRONIZATION SYSTEM AND TIME SYNCHRONIZATION METHOD IN TRAIN

(75) Inventors: Hidetoshi Homma, Kobe (JP);
Masayuki Takeyama, Chiyoda (JP);
Ryuya Mo, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 552 days.

(21) Appl. No.: 12/745,120

(22) PCT Filed: Jun. 13, 2008

(86) PCT No.: PCT/JP2008/060880
§ 371 (c)(1),
(2), (4) Date: May 27, 2010

(87) PCT Pub. No.: WO2009/069329
PCT Pub. Date: Jun. 4, 2009

(65) Prior Publication Data
US 2010/0322267 A1    Dec. 23, 2010

(30) Foreign Application Priority Data
Nov. 30, 2007    (JP) .................................. 2007-311450

(51) Int. Cl.
*H04J 3/06*    (2006.01)
(52) U.S. Cl.
USPC ........................................................ 370/503
(58) Field of Classification Search
USPC .................. 370/503–522, 310–350
See application file for complete search history.

(56) References Cited

U.S. PATENT DOCUMENTS 6,459,657 B1   10/2002   Takada et al.
7,304,981 B2 *  12/2007  Yoon et al. ..................... 370/350
(Continued)

FOREIGN PATENT DOCUMENTS

CN    2862125 Y    1/2007
JP    5-160846 A    6/1993
(Continued)

OTHER PUBLICATIONS

Office Action (Decision on Grant) dated Sep. 29, 2011, issued in the corresponding Russian Patent Application No. 2010126640, and an English Translation thereof.

(Continued)

*Primary Examiner* — Kwang B Yao
*Assistant Examiner* — Juvena Loo
(74) *Attorney, Agent, or Firm* — Buchanan Ingersoll & Rooney PC (57) ABSTRACT

An inter-vehicle network that connects monitoring and control devices communicating with an intra-vehicle network that couples in-vehicle devices with the monitoring and control devices. A train clock station at an uppermost level in a hierarchical structure and a vehicle clock station in a middle level in a hierarchical structure are established from the monitoring and control devices. Other devices are established as a correction information waiting station at a lowermost level in the hierarchical structure. The train clock station performs a time correction of its own station with time information that is arbitrarily obtained as reference time. The vehicle clock station performs a time correction of its own station based on a message transmitted from the train clock station. The correction information waiting station performs a time correction of its own station based on a message transmitted from the vehicle clock station.

10 Claims, 6 Drawing Sheets

(56) References Cited

U.S. PATENT DOCUMENTS

| | | | |
|---|---|---|---|
| 2004/0001516 A1* | 1/2004 | Friedrichs et al. | 370/506 |
| 2007/0081514 A1* | 4/2007 | Shirokura et al. | 370/350 |
| 2008/0240072 A1* | 10/2008 | Bykovnikov | 370/350 |
| 2010/0044333 A1 | 2/2010 | Marvel et al. | |
| 2010/0074180 A1* | 3/2010 | Palanki et al. | 370/328 |
| 2011/0090925 A1* | 4/2011 | Blum et al. | 370/503 |

FOREIGN PATENT DOCUMENTS

| | | |
|---|---|---|
| JP | 6-274243 A | 9/1994 |
| JP | 2000-338273 A | 12/2000 |
| JP | 2004-205465 A | 7/2004 |
| JP | 2007-178226 A | 7/2007 |
| RU | 2238860 C1 | 10/2004 |
| WO | 2007/008756 A1 | 1/2007 |

OTHER PUBLICATIONS

International Search Report (PCT/ISA/210) for PCT/JP2008/060880 dated Jul. 8, 2008.

Written Opinion (PCT/ISA/237) for PCT/JP2008/060880 dated Jul. 8, 2008.

Office Action dated May 18, 2011, issued in the corresponding Chinese Patent Application No. 200880118667.4.

Extended Search Report from European Patent Office dated Apr. 16, 2013, issued in corresponding European Patent Application No. 08765590.8. (5 pages).

* cited by examiner

TIME SYNCHRONIZATION SYSTEM AND TIME SYNCHRONIZATION METHOD IN TRAIN

TECHNICAL FIELD

The present invention relates to a time synchronization system that synchronizes time between various devices mounted on a train and a time synchronization method.

BACKGROUND ART

On a recent train, many in-vehicle devices (a propulsion control device, a power-supply device, a brake device, a door device, an air-conditioning device, a toilet device, an ATC device, and the like) are mounted. These vehicle-mounted devices generally include a self-diagnosis function performed by a built-in microcomputer and are connected by a vehicle network (an inter-vehicle network and an intra-vehicle network) for exchanging required information.

As described above, because many in-vehicle devices operate while correlating with each other in a recent train, the importance of time information increases, which each of the devices records for recognizing the correlation therebetween when a failure or an abnormality occurs. Therefore, a means and a method for causing a time error in many in-vehicle devices to be equal to or lower than a predetermined value are desired.

There is a document that discloses a technology for securing the time synchronization between computer systems mounted on a train although the technology does not provide a time synchronization method for many in-vehicle devices mounted on the train (for example, see Patent Document 1).

In the method disclosed in Patent Document 1, a synchronization signal generating unit 3 that generates a synchronization signal is provided. A contact signal line 4 for transmitting the synchronization signal to a synchronization-signal-generated-time measuring unit 5 and a post-synchronization-signal-generation time counting unit 10 is also provided. The synchronization-signal-generated-time measuring unit 5 measures the time at which the synchronization signal is generated based on time data output from a time measuring unit 2, and the post-synchronization-signal-generation time counting unit 10 counts time after the synchronization signal is input. Then, a time calculation processing unit 11 obtains the time measured by the synchronization-signal-generated-time measuring unit 5 and adds the time counted by the post-synchronization-signal-generation time counting unit 10 to the obtained time to calculate the current time.

Patent Document 1: Japanese Patent Application Laid-open No. H06-274243

DISCLOSURE OF INVENTION

Problem to be Solved by the Invention

However, the method disclosed in the above Patent Document 1 is for performing the time synchronization between computer systems mounted on a train and does not consider the time synchronization with respect to many in-vehicle devices. When this method disclosed in Patent Document 1 is applied to a train on which many in-vehicle devices are mounted, at least a synchronization-signal-generated-time measuring unit needs to be provided on the side subjected to the time synchronization, and at least a post-synchronization-signal-generation time counting unit and a time calculation processing unit need to be provided on the side performing the time synchronization. Thus, there are problems in that the device configuration becomes complicated and the cost increases.

The present invention is achieved in view of the above, and it is an object to provide a time synchronization system and a time synchronization method capable of easily and reliably performing time synchronization on many in-vehicle devices mounted on a train.

Means for Solving Problem

A time synchronization system according to an aspect of the present invention that utilizes a communication function in each of an inter-vehicle network, which connects monitoring and control devices arranged in respective vehicles of a train, and an intra-vehicle network, which couples an in-vehicle device mounted on each of the vehicles and each of the monitoring and control devices, and performs time synchronization between the monitoring and control devices and between each of the monitoring and control devices and the in-vehicle device, the time synchronization system includes a train clock station that is ranked at an uppermost in a hierarchical structure and is selected from among the monitoring and control devices in the train for supplying a reference time of the train; a vehicle clock station that is ranked in a middle in the hierarchical structure and is selected from among the monitoring and control devices in the train; and a correction information waiting station that is ranked at a lowermost in the hierarchical structure and includes the monitoring and control device, which is not selected as any of the train clock station and the vehicle clock station, and the in-vehicle device, wherein the train clock station includes a time correcting unit that appropriately performs a time correction of the own station with time information that is arbitrarily obtained as the reference time, and a message generating unit that generates based on the corrected reference time a first time-correction-information message for causing all of the vehicle clock stations to perform a time correction, the vehicle clock station includes a time correcting unit that performs a time correction of the own station based on the first time-correction-information message transmitted from the train clock station, and a message generating unit that generates based on the corrected time of the own station a second time-correction-information message for causing the correction information waiting station to perform a time correction, the correction information waiting station includes a time correcting unit that performs a time correction of the own station based on the second time-correction-information message transmitted from the vehicle clock station, and the first time-correction-information message and the second time-correction-information message are regularly transmitted at a predetermined period.

Effect of the Invention

According to the time synchronization system in the present invention, a communication function in each of an inter-vehicle network, which connects monitoring and control devices arranged in respective vehicles of a train, and an intra-vehicle network, which couples an in-vehicle device mounted on each of the vehicles and each of the monitoring and control devices, is utilized. A train clock station that is ranked at an uppermost in a hierarchical structure and is selected from among the monitoring and control devices in the train for supplying a reference time of the train, a vehicle clock station that is ranked in a middle in the hierarchical structure and is selected from among the monitoring and control devices in the train, and a correction information waiting station that is ranked at a lowermost in the hierarchical structure and includes the monitoring and control device, which is not selected as any of the train clock station and the vehicle clock station, and the in-vehicle device are set. The train clock station appropriately performs a time correction of the own station with time information that is arbitrarily obtained as the reference time, the vehicle clock station performs a time correction of the own station based on a first time-correction-information message transmitted from the train clock station, and the correction information waiting station performs a time correction of the own station based on a second time-correction-information message transmitted from the vehicle clock station. Thus, the time synchronization with respect to many in-vehicle devices mounted on the train can be performed easily and reliably.

EXPLANATIONS OF LETTERS OR NUMERALS

10 Train
11 Vehicle group
12 Automatic coupler
14 Monitoring and control device
15 Node device
16 Controller
17 Transmission path
21a, 21b Converter
23 to 27 Serial line
28 Operation control base
30 Communication control device
32 Power-supply device
34 Brake control device
36 Propulsion control device
40 Air-conditioning device
42 ATC device
44 Door device
46 Toilet device
48 GPS receiver
50 Train clock station
52 Time correcting unit
54 Time-correction-information-message generating unit
60 Vehicle clock station
62 Time correcting unit
64 Time-correction-information-message generating unit
70 Correction information waiting station
72 Time correcting unit

BEST MODE(S) FOR CARRYING OUT THE INVENTION

Exemplary embodiments of a time synchronization system and a time synchronization method according to the present invention will be explained in detail below with reference to the accompanying drawings. The present invention is not limited to the following embodiments.

(Schematic Configuration of Train Having Time Synchronization Function)

Figure 1:
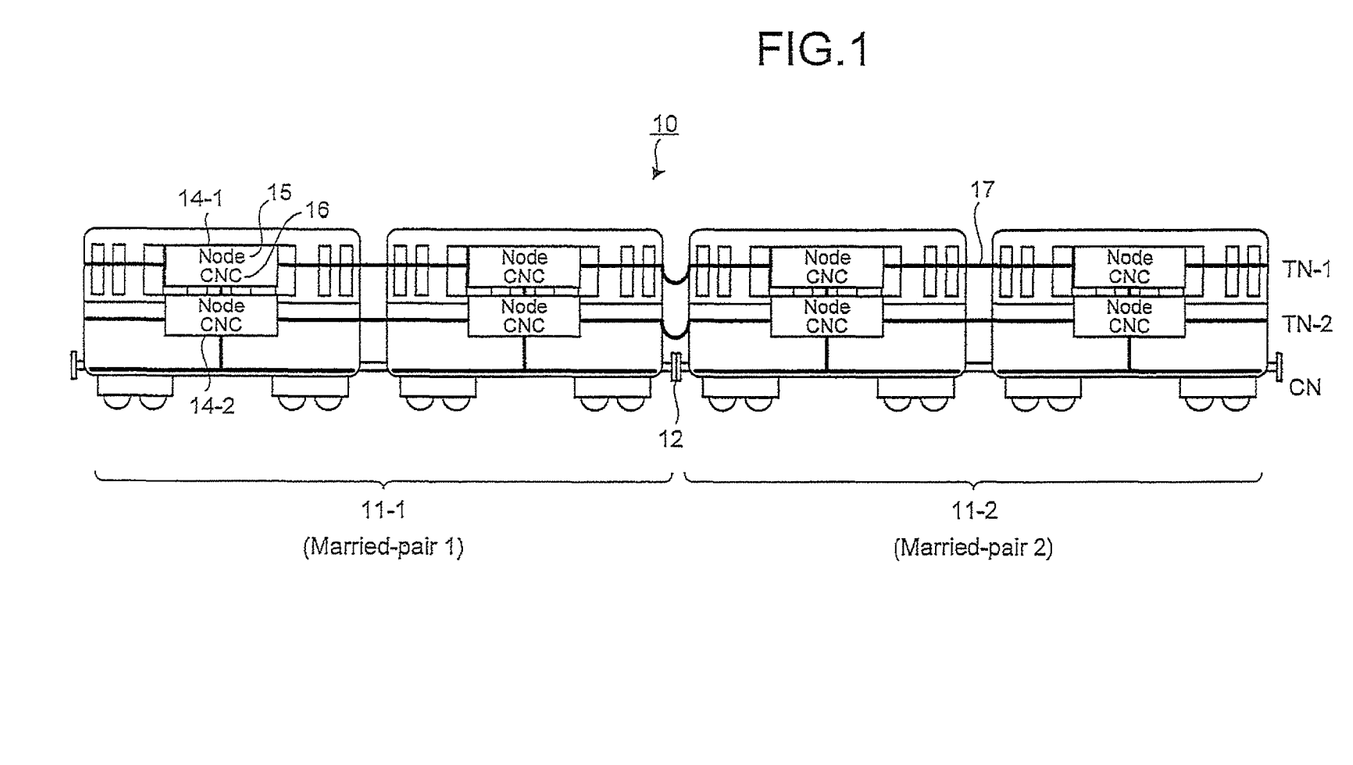
FIG. 1 is a diagram illustrating a schematic configuration of a train on which monitoring and control devices that provide a time synchronization function are mounted according to an embodiment of the present invention.

FIG. 1 is a diagram illustrating a schematic configuration of a train on which monitoring and control devices that provide a time synchronization function according to an embodiment of the present invention are mounted. In an example shown in FIG. 1, a train 10 is configured by coupling a vehicle group 11-1 (Married-pair 1) and a vehicle group 11-2 (Married-pair 2), each of which consists of two vehicles, via an automatic coupler 12. On each vehicle of the train 10, monitoring and control devices 14 (14-1 and 14-2) are mounted, each of which includes a node device (Node) 15 having a signal converting function and a controller (CNC) 16. The controller (CNC) 16 has a time synchronization function according to the present embodiment, a function of controlling communication (communication in a train) in the vehicle and between the vehicles, and a function of managing a state of various devices in each vehicle. The monitoring and control devices 14 mounted on respective vehicles are connected via a transmission line 17 to configure inter-vehicle networks (TN-1 and TN-2) that are a dual system (redundant system) network in the train 10. In each vehicle, an intra-vehicle network (CN) that is different from the inter-vehicle networks is formed. This intra-vehicle network (CN) is connected to the inter-vehicle networks (TN-1 and TN-2) via the controllers 16 and the node devices 15.

Figure 2:
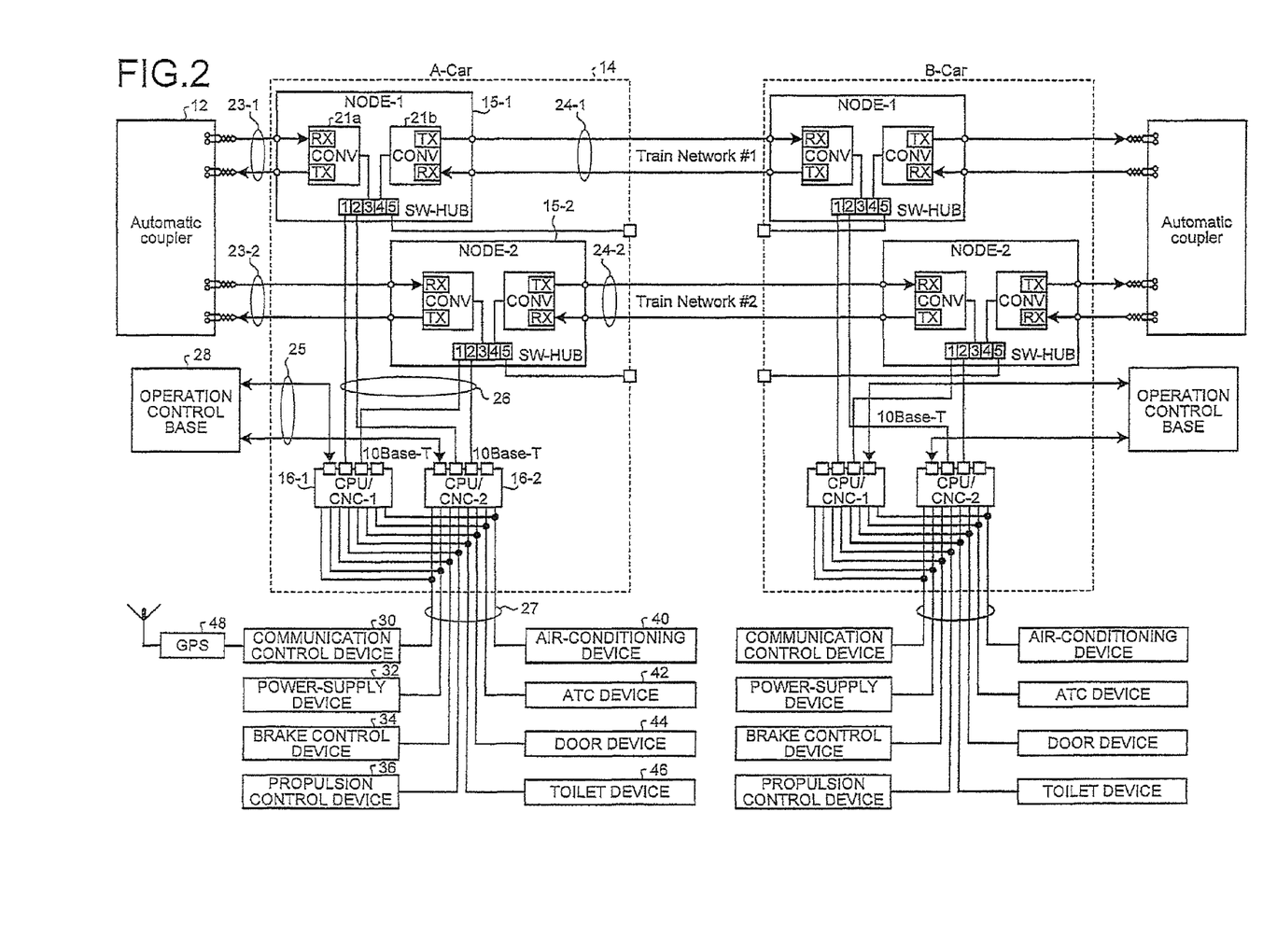
FIG. 2 is a diagram illustrating a configuration and a connection condition of the monitoring and control devices that provide the time synchronization function according to the present embodiment.

In FIG. 1 and FIG. 2 to be explained below, explanation is given for a train configured by coupling a plurality of vehicle groups each consisting of two vehicles as an example; however, the time synchronization system and the time synchronization method according to the present embodiment can be applied even to a train configured by coupling a plurality of vehicle groups each consisting of a single vehicle. Also, the system configuration is shown as an example in which the inter-vehicle networks (TN-1 and TN-2), the node devices 15, and the controllers 16 are dual systems; however, they can be single systems.

(Configuration of Monitoring and Control Device)

Next, the configuration and the connection condition of the monitoring and control devices are explained with reference to FIG. 2. FIG. 2 is a diagram illustrating the configuration and the connection condition of the monitoring and control devices that provide the time synchronization function according to the present embodiment. In FIG. 2, the monitoring and control device 14 includes a node device 15-1 that forms one of the dual systems (a main system and a sub system), a node device 15-2 that forms the other of the dual systems, and controllers 16-1 and 16-2 that are connected to the node devices 15-1 and 15-2, respectively. The monitoring and control device 14 also has serial lines 23 to 27, for example. The serial lines 23 (23-1 and 23-2) are connected to the automatic coupler 12 and provide an interface for performing communication with the node device of the adjacent other vehicle group via the electrical contact of the automatic coupler 12. The serial lines 24 (24-1 and 24-2) provide an interface for performing communication with the node device of the other vehicle in the same vehicle group. Both of them are components for providing one communication function in the above-described inter-vehicle networks (TN-1 and TN-2; Train_Network). On the other hand, the serial line 25 provides an interface for transmitting operation control information (brake instruction, rate information, and opening/closing information of a door) and the like to an operation control base 28. The serial line 26 provides an interface for the node devices 15 and the controllers 16 performing communication with a predetermined protocol. Moreover, the serial line 27 provides an interface for performing communication with the in-vehicle devices including a power-supply device 32, a brake control device 34, a propulsion control device 36, an air-conditioning device 40, an automatic train control (ATC) device 42, a door device 44, and a toilet device 46, in addition to a communication control device 30 that is connected, for example, to a GPS receiver 48. These serial interfaces are components for providing one communication function in the above-described intra-vehicle network (CN: Car_Network).

The node devices 15-1 and 15-2 are devices independent from each other. The node device 15-1 is connected to the serial lines 23-1 and 24-1, and the node device 15-2 is connected to the serial lines 23-2 and 24-2. An HDLC signal is used for the data transmission between the respective node deices 15, and an Ethernet (registered trademark) signal is used for the data transmission between the node device 15 and the controller 16, for example.

In the present embodiment, in order to perform stable and reliable communications between the inter-vehicle network, in which a signal with relatively low signal quality flows, and the intra-vehicle network, in which a signal with relatively high signal quality flows, the node device 15 includes converters (CONV) 21a and 21b that perform signal conversion between these signals; however, these converters 21a and 21b do not need to be provided if the signal quality is less of a problem. In this case, a signal of the same protocol can be used for the serial lines 23 and 24 and the serial line 26.

(Concept of Time Synchronization Function)

Figure 3:
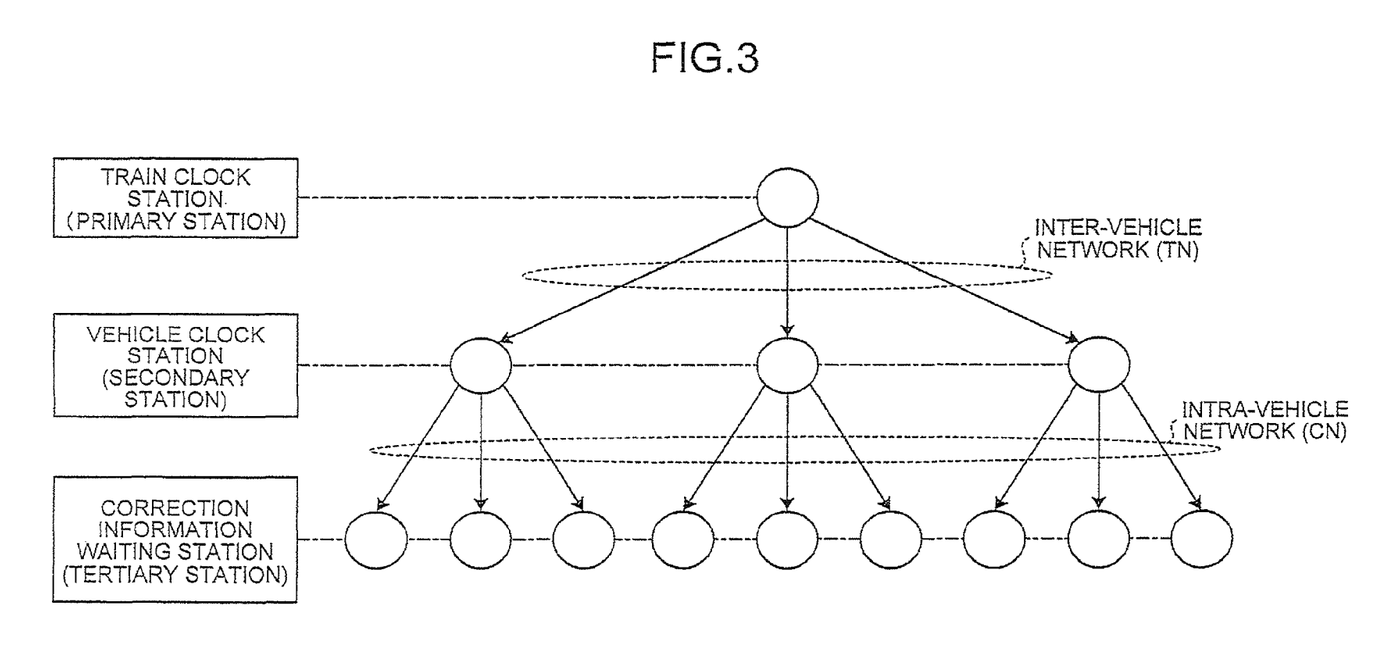
FIG. 3 is a diagram illustrating by a hierarchical structure a concept of the time synchronization function according to the present embodiment.

Next, the concept of the time synchronization function is explained with reference to FIG. 3. FIG. 3 is a diagram illustrating by a hierarchical structure the concept of the time synchronization function according to the present embodiment.

When performing the time synchronization function according to the present embodiment, a predetermined position and a role corresponding to the position are assigned to the monitoring and control devices 14 in each vehicle and the in-vehicle devices (see FIG. 2) connected to the monitoring and control devices 14. Specifically, to the monitoring and control devices 14, a position of a train clock station (primary station) ranked at the uppermost of the hierarchical structure or a vehicle clock station (secondary station) ranked in the middle of the hierarchical structure as shown in FIG. 3 is assigned. Moreover, to the in-vehicle devices, a position of a correction information waiting station (tertiary station) ranked at the lower position of the hierarchical structure as shown in FIG. 3 is assigned. Therefore, when the position of the train clock station is assigned to one monitoring and control device, the position of the vehicle clock station is assigned to the remaining monitoring and control devices to which the position of the train clock station has not been assigned, and the position of the correction information waiting station is assigned to all of the in-vehicle devices connected to the monitoring and control devices. The positions of both of the train clock station (primary station) and the vehicle clock station (secondary station) are assigned to the monitoring and control device to which the position of the train clock station has been assigned. As a result of assigning such positions, the communication between the train clock station (primary station) and the vehicle clock station (secondary station) is performed via the inter-vehicle networks (TN), and the communication between the vehicle clock station (secondary station) and the correction information waiting station (tertiary station) is performed via the intra-vehicle network (CN).

It is acceptable that one of the controller 16-1 and the controller 16-2 included in the monitoring and control device 14 functions as the train clock station and the vehicle clock station. In this case, any one of the controllers can be the train clock station and/or the vehicle clock station. For example, in the dual redundant systems, the controller operating as the main system can be selected, or the controller operating as the sub system can be selected for distributing the processing load. Moreover, in the controller 16-1 or the controller 16-2, when the controller 16-1 functions as both of the train clock station and the vehicle clock station, the controller 16-2 is positioned as the correction information waiting station.

(Operation based on Time Synchronization Function)

Figure 4:
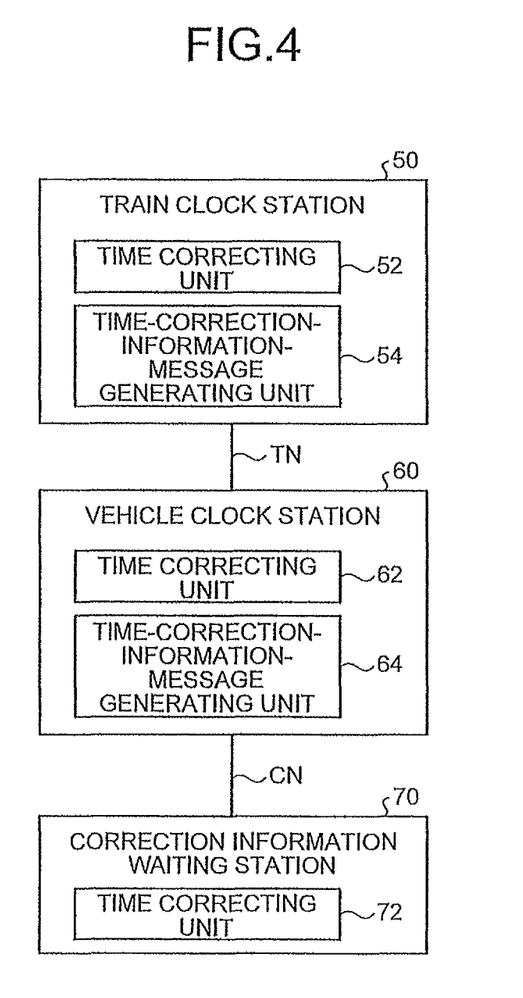
FIG. 4 is a block diagram illustrating function configurations of a train clock station, a vehicle clock station, and a correction information waiting station.
Figure 5:
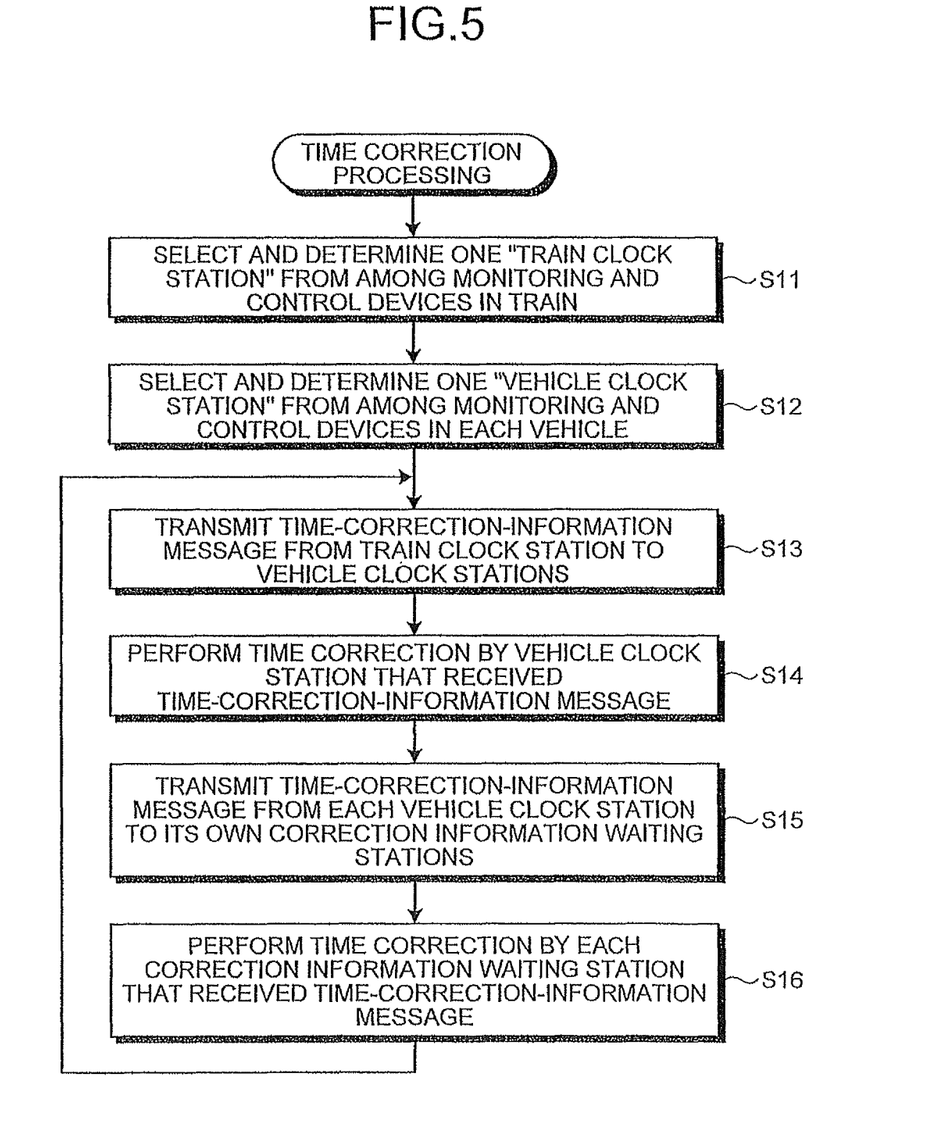
FIG. 5 is a flowchart illustrating a processing flow of time correction processing by the train clock station, the vehicle clock station, and the correction information waiting station.

Next, the operation based on the time synchronization function is explained with reference to FIG. 4 and FIG. 5. FIG. 4 is a block diagram illustrating function configurations of the train clock station, the vehicle clock station, and the correction information waiting station. FIG. 5 is a flowchart illustrating a processing flow of time correction processing by the train clock station, the vehicle clock station, and the correction information waiting station.

First, one "train clock station" is selected and determined from among the monitoring and control devices in the train (Step S11). Next, one "vehicle clock station" is selected and determined from among the monitoring and control devices in each vehicle (Step S12). The train clock station obtains time information via the GPS receiver 48 (see FIG. 2), for example, and performs time correction of itself with the obtained time as a reference time. The train clock station generates a message (hereinafter, referred to as "first time-correction-information message") including correction information necessary for the time correction and transmits it to the vehicle clock stations (Step S13). This processing is performed in a time correcting unit 52 and a time-correction-information-message generating unit 54 in a train clock station 50 (see FIG. 4). Upon receiving the first time-correction-information message from the train clock station, the vehicle clock station performs the time correction of itself (Step S14). The vehicle clock station generates a time-correction-information message (hereinafter, "second time-correction-information message") for transmitting to the correction information waiting stations and transmits it to the correction information waiting stations (Step S15). This processing is performed in a time correcting unit 62 and a time-correction-information-message generating unit 64 in a vehicle clock station 60 (see FIG. 4). Upon receiving the second time-correction-information message from the vehicle clock station, the correction information waiting station performs the time correction of itself (Step S16). This processing is performed in a time correcting unit 72 in a correction information waiting station 70 (see FIG. 4). Thereafter, the processing of the above-mentioned Steps S13 to S16 is repeated at a constant period. Thus, the time correction with respect to all of the devices having clock function present in the train is regularly performed.

In the above processing, the correction information included in the time correction information message transmitted from the train clock station to the vehicle clock station and the time correction information message transmitted from the vehicle clock station to the correction information waiting station can be any information so long as it is information with which the time correction can be performed on the receiving side. As the simplest example, the reference time itself can be transmitted.

Moreover, in the present embodiment, as time correction and generating processing of the time correction information message performed by the train clock station, an example is given for the case of using information from the GPS receiver; however, the time information obtained from other than the GPS receiver can be used. For example, the time information obtained from a broadcast station, a radio clock, or the like, input information from a not-shown manual input device, and the like can be used.

Furthermore, in each processing of the above-mentioned Steps S13 and S15, the period of transmitting the time correction information message from the train clock station to the vehicle clock station and the period of transmitting the time correction information message from the vehicle clock station to the correction information waiting station are the same; however, these periods can be made different for reducing the amount of messages flowing in the inter-vehicle network or the intra-vehicle network (especially, the intra-vehicle network) or for reducing the load on the vehicle clock station.

Figure 6:
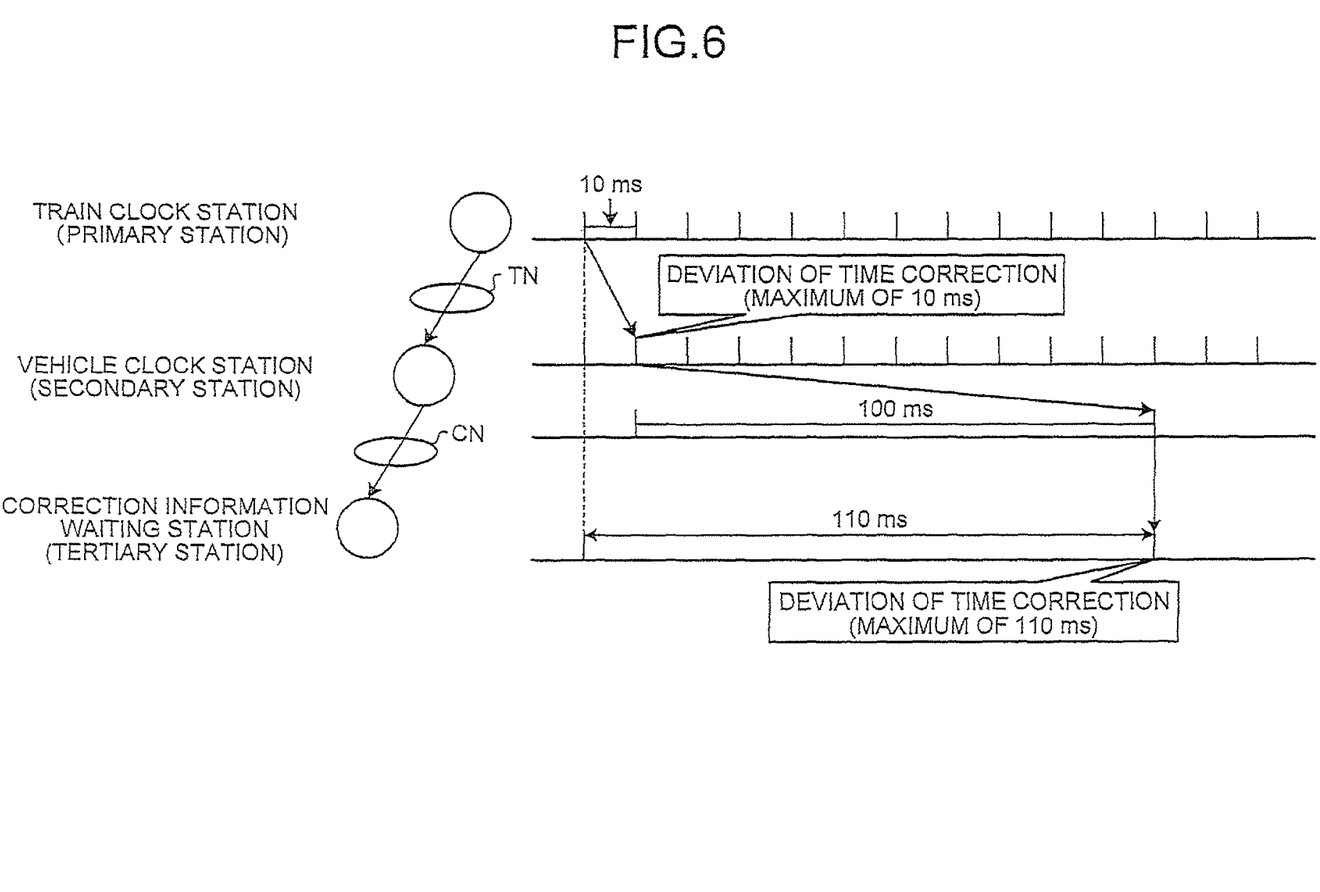
FIG. 6 is a diagram explaining a deviation of a time correction when a transmission period of a time correction information message to the vehicle clock station and a transmission period of a time correction information message to an in-vehicle device are made different.

FIG. 6 is a diagram explaining a deviation of the time correction when the transmission period of the time correction information message to the vehicle clock station and the transmission period of the time correction information message to the correction information waiting station are made different. More specifically, a case is shown in which the transmission period of the time correction information message to the vehicle clock station is 10 ms and the transmission period of the time correction information message to the correction information waiting station is 100 ms.

In FIG. 6, the train clock station transmits the time correction information message to the vehicle clock station with a periodic interval of 10 ms. In this case, the deviation of the time correction between the train clock station and the vehicle clock station is a maximum of 10 ms disregarding the transmission time (the transmission time is short and therefore can be disregarded). On the other hand, the vehicle clock station transmits the time correction information message to the correction information waiting station with a periodic interval of 100 ms. In this case, the deviation of the time correction between the vehicle clock station and the correction information waiting station is a maximum of 100 ms disregarding the transmission time. Consequently, the deviation of the time correction between the train clock station and the correction information waiting station is a maximum of 110 ms (=10+100). The time deviation of 110 ms is the maximum deviation, and the actual time deviation can be suppressed to be equal to or lower than 110 ms by regularly performing the time correction at a constant period.

When the time difference, the summer time (day time), or the like needs to be considered in the time correction, it is possible to generate the time correction information message to which such information is added on the transmitting side (train clock station) and transmit it. Moreover, it is also possible to transmit the reference time and convert it into a desired time by referring to area information, calendar information, and the like on the receiving side.

As explained above, according to the time synchronization system in the present embodiment, a communication function in each of an inter-vehicle network, which connects monitoring and control devices arranged in respective vehicles of a train, and an intra-vehicle network, which couples an in-vehicle device mounted on each of the vehicles and each of the monitoring and control devices, is utilized. A train clock station that is ranked at an uppermost in a hierarchical structure and is selected from among the monitoring and control devices in the train for supplying a reference time of the train and a vehicle clock station that is ranked in a middle in the hierarchical structure and is selected from among the monitoring and control devices in the train are set. Other devices are set as a correction information waiting station that is ranked at a lowermost in the hierarchical structure. The train clock station appropriately performs a time correction of itself with time information that is arbitrarily obtained as the reference time, the vehicle clock station performs a time correction of itself based on a first time-correction-information message transmitted from the train clock station, and the correction information waiting station performs a time correction of itself based on a second time-correction-information message transmitted from the vehicle clock station. Thus, the time synchronization with respect to many in-vehicle devices mounted on the train can be performed easily and reliably.

Moreover, according to the time synchronization method in the present embodiment, a communication function in each of an inter-vehicle network, which connects monitoring and control devices arranged in respective vehicles of a train, and an intra-vehicle network, which couples an in-vehicle device mounted on each of the vehicles and each of the monitoring and control devices, is utilized. A train clock station that is ranked at an uppermost in a hierarchical structure and is selected from among the monitoring and control devices in the train for supplying a reference time of the train, a vehicle clock station that is ranked in a middle in the hierarchical structure and is selected from among the monitoring and control devices in the train, and a correction information waiting station that is ranked at a lowermost in the hierarchical structure and includes the monitoring and control devices that are not selected as any of the train clock station and the vehicle clock station and the in-vehicle device are set. A step performed by the train clock station includes appropriately performing a time correction of itself with time information that is arbitrarily obtained as the reference time, generating a first time-correction-information message for causing the vehicle clock station to perform a time correction based on corrected reference time, and transmitting generated first time-correction-information message to the vehicle clock station. A step performed by the vehicle clock station includes receiving the first time-correction-information message transmitted from the train clock station, performing a time correction of itself based on the first time-correction-information message, generating a second time-correction-information message for causing the correction information waiting station to perform a time correction based on corrected time of itself, and transmitting generated second time-correction-information message to the correction information waiting station. A step performed by the correction information waiting station includes receiving the second time-correction-information message transmitted from the vehicle clock station, and performing a time correction of itself based on the second time-correction-information message. Thus, the time synchronization with respect to many in-vehicle devices mounted on the train can be performed easily and reliably.

Furthermore, according to the time synchronization system and the time synchronization method in the present embodiment, because the periodic message exchange is performed in the hierarchical network that is the inter-vehicle network and the intra-vehicle network, the time error in the in-vehicle device as the correction target is determined in accordance with the transmission delay time and the resolution of the time data. Consequently, the effect of making the variation in the time error in the in-vehicle devices small and making the time error in each device in the vehicle and the train equalized can be obtained. This effect is extremely useful in the analysis when a failure or an abnormality occurs in the in-vehicle device.

The periodic message exchange in the hierarchical network is a function that a typical monitoring and control device basically has. Therefore, in constructing the time correction function according to the present embodiment, addition of a component, major modification of software, and the like are not necessary, enabling to achieve a system configuration capable of suppressing a cost increase.

Moreover, the configuration of the device connected to the network may be dynamically changed in accordance with the separation and/or coupling of the vehicle of the train, the start and/or stop of the in-vehicle device, or the like. The above described processing procedure does not need to be changed even in such a case. Therefore, the simple system configuration that does not require complex processing can be achieved.

INDUSTRIAL APPLICABILITY

As described above, the time synchronization system and the time synchronization method according to the present invention is useful as an invention with which the time synchronization to many in-vehicle devices mounted on a train can be performed easily and reliably.

The invention claimed is:

1. A time synchronization system that utilizes a communication function in each of an inter-vehicle network, which connects monitoring and control devices arranged in respective vehicles of a train, and an intra-vehicle network, which couples an in-vehicle device mounted on each of the vehicles and each of the monitoring and control devices, and performs time synchronization between the monitoring and control devices and between each of the monitoring and control devices and the in-vehicle device, the time synchronization system comprising:
a train clock station that is ranked at an uppermost in a hierarchical structure and is selected from among the monitoring and control devices in the train for supplying a reference time of the train;
a vehicle clock station that is ranked in a middle in the hierarchical structure and is selected from among the monitoring and control devices in the train; and
a correction information waiting station that is ranked at a lowermost in the hierarchical structure and includes the monitoring and control device, which is not selected as any of the train clock station and the vehicle clock station, and the in-vehicle device, wherein
the train clock station includes
a time correcting unit that appropriately performs a time correction of the own station with time information that is arbitrarily obtained as the reference time, and
a message generating unit that generates based on the corrected reference time a first time-correction-information message for causing all of the vehicle clock stations to perform a time correction,
the vehicle clock station includes
a time correcting unit that performs a time correction of the own station based on the first time-correction-information message transmitted from the train clock station, and
a message generating unit that generates based on the corrected time of the own station a second time-correction-information message for causing the correction information waiting station to perform a time correction,
the correction information waiting station includes a time correcting unit that performs a time correction of the own station based on the second time-correction-information message transmitted from the vehicle clock station, and
the first time-correction-information message and the second time-correction-information message are regularly transmitted at a predetermined period.

2. The time synchronization system according to claim 1, wherein a transmission period of the first time-correction-information message and a transmission period of the second time-correction-information message are set to be different.

3. The time synchronization system according to claim 1, wherein a transmission period of the first time-correction-information message is set to be shorter than a transmission period of the second time-correction-information message.

4. The time synchronization system according to claim 1, wherein the reference time is time information obtained through a GPS receiver.

5. The time synchronization system according to claim 1, wherein the first time-correction-information message and the second time-correction-information message are regularly transmitted at predetermined periods such that a sum of the transmission periods of the first time-correction-information message and the second time-correction-information message is a desired time deviation.

6. A time synchronization method of utilizing a communication function in each of an inter-vehicle network, which connects monitoring and control devices arranged in respective vehicles of a train, and an intra-vehicle network, which couples an in-vehicle device mounted on each of the vehicles and each of the monitoring and control devices, and performing time synchronization between the monitoring and control devices and between each of the monitoring and control devices and the in-vehicle device, the time synchronization method comprising:
a step of setting
a train clock station that is ranked at an uppermost in a hierarchical structure and is selected from among the monitoring and control devices in the train for supplying a reference time of the train,
a vehicle clock station that is ranked in a middle in the hierarchical structure and is selected from among the monitoring and control devices in the train, and
a correction information waiting station that is ranked at a lowermost in the hierarchical structure and includes the monitoring and control device, which is not selected as any of the train clock station and the vehicle clock station, and the in-vehicle device;
a step performed by the train clock station, including
a step of appropriately performing a time correction of the own station with time information that is arbitrarily obtained as the reference time,
a step of generating based on the corrected reference time a first time-correction-information message for causing all of the vehicle clock stations to perform a time correction, and a step of transmitting generated first time-correction-information message to the vehicle clock station;

a step performed by the vehicle clock station, including
- a step of receiving the first time-correction-information message transmitted from the train clock station,
- a step of performing a time correction of the own station based on the first time-correction-information message,
- a step of generating based on the corrected time of the own station a second time-correction-information message for causing the correction information waiting station to perform a time correction, and
- a step of transmitting generated second time-correction-information message to the correction information waiting station; and a step performed by the correction information waiting station, including
- a step of receiving the second time-correction-information message transmitted from the vehicle clock station, and
- a step of performing a time correction of the own station based on the second time-correction-information message, wherein the first time-correction-information message and the second time-correction-information message are regularly transmitted at a predetermined period.

7. The time synchronization method according to claim 6, wherein a transmission period of the first time-correction-information message and a transmission period of the second time-correction-information message are set to be different.

8. The time synchronization method according to claim 6, wherein a transmission period of the first time-correction-information message is set to be shorter than a transmission period of the second time-correction-information message.

9. The time synchronization method according to claim 6, wherein the reference time is time information obtained through a GPS receiver.

10. The time synchronization method according to claim 6, wherein the first time-correction-information message and the second time-correction-information message are regularly transmitted at predetermined periods such that a sum of the transmission periods of the first time-correction-information message and the second time-correction-information message is a desired time deviation.

* * * * *